United States Patent
Zhou

(10) Patent No.: US 10,880,583 B2
(45) Date of Patent: Dec. 29, 2020

(54) METHOD, APPARATUS, TERMINAL, AND READABLE STORAGE MEDIUM FOR OFFLINE CACHING

(71) Applicant: ADVANCED NEW TECHNOLOGIES CO., LTD., Grand Cayman (KY)

(72) Inventor: Yixiao Zhou, Hangzhou (CN)

(73) Assignee: ADVANCED NEW TECHNOLOGIES CO., LTD., Grand Cayman (KY)

( * ) Notice: Subject to any disclaimer, the term of this patent is extended or adjusted under 35 U.S.C. 154(b) by 0 days.

(21) Appl. No.: 16/838,920

(22) Filed: Apr. 2, 2020

(65) Prior Publication Data

US 2020/0245006 A1 Jul. 30, 2020

Related U.S. Application Data

(63) Continuation of application No. PCT/CN2020/071483, filed on Jan. 10, 2020.

(30) Foreign Application Priority Data

Apr. 26, 2019 (CN) .......................... 2019 1 0345424

(51) Int. Cl.
*H04N 21/231* (2011.01)
*H04N 21/2387* (2011.01)
*H04N 21/24* (2011.01)
*H04N 21/2183* (2011.01)
*H04N 21/443* (2011.01)

(52) U.S. Cl.
CPC ... *H04N 21/23106* (2013.01); *H04N 21/2183* (2013.01); *H04N 21/2387* (2013.01); *H04N 21/2407* (2013.01); *H04N 21/4431* (2013.01)

(58) Field of Classification Search
None
See application file for complete search history.

(56) References Cited

U.S. PATENT DOCUMENTS

| 5,796,971 | A | 8/1998 | Emberson |
| 5,918,245 | A | 6/1999 | Yung |
| 6,757,896 | B1 | 6/2004 | Cohen et al. |

(Continued)

FOREIGN PATENT DOCUMENTS

| CN | 102035881 A | 4/2011 |
| CN | 105760232 A | 7/2016 |

(Continued)

OTHER PUBLICATIONS

First Search for Chinese Application No. 201910345424.4 dated Apr. 26, 2020.

(Continued)

*Primary Examiner* — Brian Whipple

(57) ABSTRACT

An offline caching method comprises: creating a cache data source module on the framework layer for downloading streaming media and a media cache module on the framework layer for writing data to a cache; downloading, by the cache data source module, a media resource from a storage, and writing the media resource into the media cache module to generate an offline cache file; storing the offline cache file; and providing the stored offline cache file to the application layer for access.

20 Claims, 6 Drawing Sheets

(56) References Cited

U.S. PATENT DOCUMENTS

| | | | |
|---|---|---|---|
| 6,823,336 B1 | 11/2004 | Srinivasan et al. | |
| 6,941,310 B2 | 9/2005 | Ahad et al. | |
| 6,983,315 B1* | 1/2006 | Crutcher | H04L 67/02 |
| | | | 709/220 |
| 7,275,105 B2 | 9/2007 | Bloch et al. | |
| 8,037,110 B2 | 10/2011 | Salgado et al. | |
| 8,903,955 B2 | 12/2014 | Kansal et al. | |
| 8,990,334 B2 | 3/2015 | Barraclough et al. | |
| 9,661,374 B1* | 5/2017 | Erdmann | H04N 21/4331 |
| 2004/0098533 A1 | 5/2004 | Henshaw et al. | |
| 2005/0256880 A1* | 11/2005 | Nam Koong | H04L 69/329 |
| 2007/0038567 A1* | 2/2007 | Allaire | H04N 21/812 |
| | | | 705/50 |
| 2009/0182945 A1* | 7/2009 | Aviles | H04L 69/16 |
| | | | 711/122 |
| 2010/0318745 A1 | 12/2010 | Wheeler et al. | |
| 2014/0040616 A1 | 2/2014 | Barber et al. | |
| 2017/0289214 A1* | 10/2017 | Cho | H04L 65/4015 |
| 2018/0352287 A1 | 12/2018 | Su et al. | |

FOREIGN PATENT DOCUMENTS

| | | |
|---|---|---|
| CN | 106354879 A | 1/2017 |
| CN | 107480235 A | 12/2017 |
| CN | 108062371 A | 5/2018 |
| CN | 108984595 A | 12/2018 |
| CN | 109240613 A | 1/2019 |
| CN | 109597568 A | 4/2019 |
| CN | 110267077 A | 9/2019 |
| KR | 20120056472 A | 6/2012 |

OTHER PUBLICATIONS

First Office Action for Chinese Application No. 201910345424.4 dated May 7, 2020.

Written Opinion and International Search Report for PCT Application No. PCT/CN2020/071483 dated Mar. 25, 2020 and made available to public on Oct. 29, 2020.

* cited by examiner

METHOD, APPARATUS, TERMINAL, AND READABLE STORAGE MEDIUM FOR OFFLINE CACHING

CROSS REFERENCE TO RELATED APPLICATIONS

This application is a continuation application of International Patent Application No. PCT/CN2020/071483, filed on Jan. 10, 2020, which claims priority to and benefits of Chinese Patent Application No. 201910345424.4 filed on Apr. 26, 2019. The contents of the above-referenced applications are incorporated herein by reference in their entirety.

TECHNICAL FIELD

Embodiments of this specification relate to the field of caching technologies, and in particular, to an offline caching method and apparatus, a terminal, and a readable storage medium.

BACKGROUND

In a scenario in which a terminal plays a resource, for example, in a digital signage scenario, advertisement content is usually presented by video, which is generally a solution of playing a video based on streaming media. Specifically, a cloud storage (a server) delivers a video resource address, and the terminal may play the video before completing resource download, that is, playing while downloading. However, because a video file is usually large and costs of performing a one-time download are relatively high, it is necessary to perform offline resource caching. Therefore, it is required that each resource can be completely cached offline after the resource is completely played once on the terminal. That is, even if a network port or a system of the terminal restarts, the cached resource is valid to be played at any time.

SUMMARY OF THE INVENTION

Embodiments of this specification provide an offline caching method and apparatus, a terminal, and a readable storage medium.

According to a first aspect, an embodiment of this specification provides an offline caching method, for performing offline resource caching on a terminal having an operating system, wherein the operating system comprises a framework layer and an application layer, the method comprising: modifying a source code of a media player component on the framework layer to create a cache data source module on the framework layer for downloading streaming media and a media cache module on the framework layer for writing data to a cache; downloading, by the cache data source module, a media resource from a storage, and writing the media resource into the media cache module to generate an offline cache file; storing the offline cache file; and providing the stored offline cache file to the application layer for access.

According to a second aspect, an embodiment of this specification provides an offline caching apparatus for performing offline resource caching on a terminal having an operating system, wherein the operating system comprises a framework layer and an application layer, the apparatus comprising: a processor; a memory configured with computer executable instructions executable by the processor to cause the processor to perform operations including: modifying a source code of a media player component on the framework layer to create a cache data source module on the framework layer for downloading streaming media and a media cache module on the framework layer for writing data to a cache; downloading, by the cache data source module, a media resource from a storage, and writing the media resource into the media cache module to generate an offline cache file; storing the offline cache file; and providing the stored offline cache file to the application layer for access.

According to a third aspect, an embodiment of this specification provides a terminal, including a memory, a processor, and a computer program that is stored in the memory and that is executable by the processor, to implement the offline caching methods described in the specification.

According to a fourth aspect, an embodiment of this specification provides a computer-readable storage medium configured with instructions executable by one or more processors to cause the one or more processors to perform operations, for performing offline resource caching on a terminal, the terminal having an operating system including a framework layer and an application layer, the operations comprising: modifying a source code of a media player component on the framework layer to create a cache data source module on the framework layer for downloading streaming media and a media cache module on the framework layer for writing data to a cache; downloading, by the cache data source module, a media resource from a cloud storage, and writing the media resource into the media cache module to generate an offline cache file; storing the offline cache file; and providing the stored offline cache file to the application layer for access.

The embodiments of this specification provide an offline caching method. By creating a cache data source module and a media cache module on a framework layer of an operating system, a streaming media playback function and decoding capability is maintained, and a cache is maintained to generate an offline cache file; therefore, a capability of playing at any time after performing one-time download is obtained. No proxy server is involved in the middle of the process, thereby greatly reducing IO of the entire system, and achieving a very smooth playback effect.

DETAILED DESCRIPTION OF THE EMBODIMENTS

Figure 1:
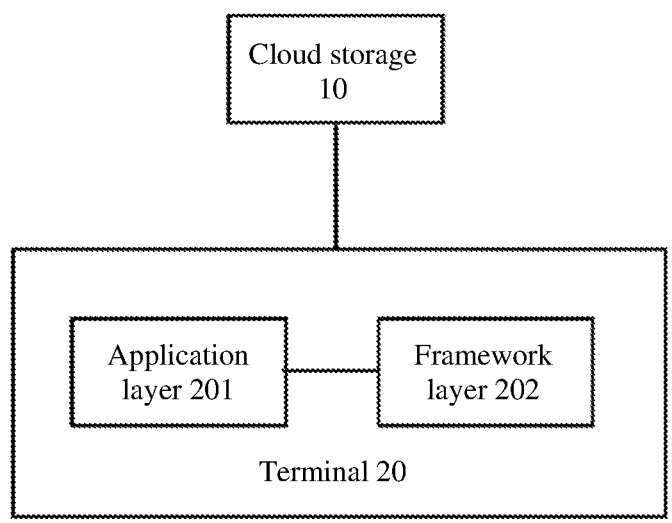
FIG. 1 is a schematic diagram of an offline caching scenario, according to an embodiment of this specification.

To better understand the above technical solutions, the technical solutions of the embodiments of this specification will be described in detail below with reference to the accompanying drawings and specific embodiments. The embodiments of this specification and specific features in the embodiments are detailed descriptions of the technical solutions of the embodiments of this specification and are not intended to limit the technical solutions of this specification. The embodiments of this specification and the technical features in the embodiments may be combined with each other without conflict.

Those skilled in the art may understand that the "terminal" or "terminal device" used in the embodiments of this specification may be a device such as a communication terminal, an Internet terminal, a music/video playback terminal, for example, a PDA, a mobile Internet device (MID), and/or a mobile phone with a music/video playback function, or a smart TV.

Those skilled in the art may understand that the "cloud" used in the embodiments of this specification includes, but is not limited to, a computer, a network host, a single network server, a plurality of network server clusters, or a cloud composed of a plurality of servers. Herein, the cloud is composed of a large quantity of computers or network servers based on cloud computing. Cloud computing is a type of distributed computing, and is a virtual supercomputer composed of a group of loosely coupled computer clusters. In the embodiments of this specification, communication between the terminal and the cloud may be implemented by any communication method, including but not limited to, mobile communication based on 3GPP, LTE, or WiMAX, computer network communication based on TCP/IP or UDP protocols, and a short-range wireless transmission method based on Bluetooth or infrared transmission standards.

Those skilled in the art should understand that the concepts of "application", "application program", "application software" and similar expressions in the embodiments of this specification are the same concept known to those skilled in the art, and refer to computer software suitable for an electronic operation, which is organically constructed by a series of computer instructions and related data resources. Unless otherwise specified, this naming is neither limited by the type or level of a programming language, nor by the operating system or platform on which the programming language is run. Certainly, such concepts are not limited by any form of terminal either.

Those skilled in the art should understand that the operating system includes an application layer (App layer) and a framework layer, and other layers that may be included from the functional division are not discussed in the embodiments of this specification. Generally, the application layer may be understood as an upper layer, which is responsible for an interface for interacting with a user, for example, application maintenance, identifying tap content of different categories when tapping a page to display different context menus, and the like. Generally, the framework layer is used as an intermediate layer, and main functions of this layer include: forwarding a user request obtained by the application layer, for example, to start a video playback function, to a lower layer; and distributing content processed by a lower layer, by using a message or an intermediate agent, to an upper layer, to present the content to the user.

An implementation of an embodiment of this specification is to improve the application layer and the framework layer, to implement offline resource caching on the terminal through cooperation between these two layers. Specifically, a cache data source module and a media cache module can be created on the framework layer. The cache data source module downloads a media resource from a cloud storage, and writes the media resource into the media cache module to generate an offline cache file; the offline cache file is stored, and the stored offline cache file is exposed to the application layer (the application layer can access the offline cache file).

FIG. 1 is a schematic diagram of an offline caching scenario, according to an embodiment of this specification. In the scenario, a cloud storage 10 and a terminal 20 are shown. The cloud storage 10 stores resources for the terminal to download and play, for example, a video resource; and the terminal 20 downloads and stores the video resource from the cloud storage 10. Further, in the terminal 20, an application layer 201 and a framework layer 202 are shown. When the application layer 201 starts a video playback function, the framework layer 202 is controlled to download and play the video resource from the cloud storage 10. Particularly, in the embodiments of the specification, after completely downloading a resource for the first time, the framework layer 202 performs memory caching on the resource to generate an offline cache file, and makes the offline cache file accessible to the application layer 201. Therefore, when being played next time, the resource does not need to be downloaded again, but instead, the offline cache file can be directly read to perform playback. In addition, by performing a maintaining operation on the cache, that is, storing the offline cache file separately, a problem that the memory caching will expire is avoided.

Figure 2:
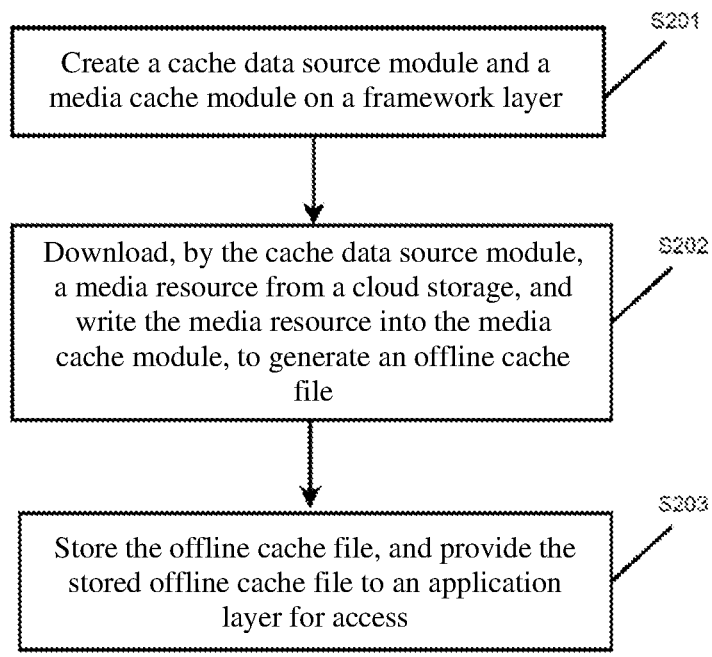
FIG. 2 is a flowchart of an offline caching method, according to an embodiment of this specification.

According to one aspect, an embodiment of the specification provides an offline caching method, for performing offline resource caching on a terminal, and an operating system of the terminal includes a framework layer and an application layer. Referring to FIG. 2, the offline caching method includes steps S201 to S203.

At S201, the method may include creating a cache data source module and a media cache module on the framework layer.

For convenience of description, this embodiment of this specification is described by using an example in which a terminal runs an Android operating system to perform offline caching on a video resource. However, it is to be noted that this embodiment of this specification is not limited to the Android system, and is not limited to offline caching of the video resource. For example, offline caching may be performed on audio resources.

In the Android system, a MediaPlayer component on the framework layer is used to control a video playback function. For example, basic steps of playing a video via the MediaPlayer are: generating a MediaPlayer object first, and after the MediaPlayer object is obtained through different generation methods according to an address of a to-be-played file, invoking, according to practical needs, different methods (for example, start, stop, pause, and release) to control resource playback. A state of the MediaPlayer object is that a setDataSource method may be invoked to migrate an object in an idle state to an initialized state.

In this embodiment, by modifying source code of the MediaPlayer component on the framework layer, functional upgrade is performed on an original DataSource module. Specifically, the source code of the MediaPlayer component is modified, a streaming media playback function and a download function of the original DataSource module of the MediaPlayer component are maintained, a caching policy is modified, and a memory caching maintaining function is newly added. Therefore, the following two modules may be created in the MediaPlayer component on the framework layer: a CacheDataSource module, configured to download streaming media; and a MediaCache module, configured to obtain and write a streaming media video resource from the CacheDataSource module.

At S202, the method may include downloading, by the cache data source module, a media resource from a cloud storage, and writes the media resource into the media cache module to generate an offline cache file.

As described above, in this embodiment of this specification, by modifying the source code of the MediaPlayer component, the CacheDataSource module and the MediaCache module replace the original DataSource module, an original streaming media playback function capability is maintained, but a caching policy is modified, that is, the memory caching is written into the MediaCache module to maintain the caching function. The offline cache file generated by the MediaCache module can be directly read by the application layer subsequently without starting the MediaPlayer component to perform a repeated download function.

In addition, because the download function and the storage function are implemented in different modules, a problem of memory caching expiration can be effectively avoided. This is because, in conventional Android video caching, a resource download function is performed through a DataSource module, and when a certain quantity of resource content is downloaded, the content is sent to an extractor for decoding and playing. At the same time, the resource is cached locally, but cannot be permanently maintained. Once the DataSource is destroyed, all caches associated with the DataSource will be lost. However, in this embodiment of the specification, the download function is implemented by the CacheDataSource module, and the cache function is implemented by the MediaCache module. By generating an offline cache file in the MediaCache module, the memory caching can be maintained. Even if the CacheDataSource module is destroyed, the cache may not expire to the existence of the offline cache file.

At S203, the method includes storing the offline cache file, and provide the stored offline cache file to the application layer for access.

Since the MediaCache module is on the framework layer in the Android system, and is not accessible to the application layer, the MediaCache module needs to be made to accessible to the application layer in a certain manner. For example, the MediaCache module may be accessible to the application layer by creating a MediaPlayer database. Specifically, between the application layer and the framework layer, a MediaPlayer database may be created. The MediaPlayer database may obtain the offline cache file transmitted by the MediaCache module, and provide an access interface to the application layer for the application layer to read the offline cache file. As another example, the offline cache file may alternatively be stored in a manner of SharedPreferences of the Android system. The SharedPreferences is a lightweight data storage manner, and mapping is performed in a key/value manner, and finally a file is stored in an xml format in a terminal. The SharedPreferences may be understood as an interface under android.content: an interface used to access and modify getSharedPreferences to return preference data. In this embodiment of this specification, when the MediaCache module generates an offline cache file, a SharedPreferences process in the operating system is invoked to store the offline cache file. SharedPreferences process is also referred to as shared-preferences process in this application.

In some embodiments, manners of providing the stored offline cache file to the application layer for access include: providing, by the player database or the shared-preferences process, an access interface to the application layer, for the application layer to read the offline cache file through the access interface. Certainly, the foregoing two manners are merely exemplary descriptions, and other manners may also be adopted to store the offline cache file and provide the offline cache file to the application layer, which is not limited in this embodiment of this specification.

On the premise that the application layer can read the offline cache file through the access interface provided by the player database or the shared-preferences process, the video resource does not need to be downloaded repeatedly every time the video resource is played, but instead, whether an offline cache file exists may be first queried. If the offline cache file exists, the offline cache file is directly read to perform a video playback function; or if the offline file does not exist, the MediaPlayer component on the framework layer is started to perform the video playback function and a download function. Therefore, when starting resource playback, the application layer queries whether the media player database or the shared-preferences process stores an offline cache file; and if the media player database or the shared-preferences process stores an offline cache file, the application layer directly reads the offline cache file to perform resource playback; or if neither the media player database nor the shared-preferences process stores an offline cache file, the application layer invokes the media player component to perform video download and playback from the cloud storage.

Figure 3:
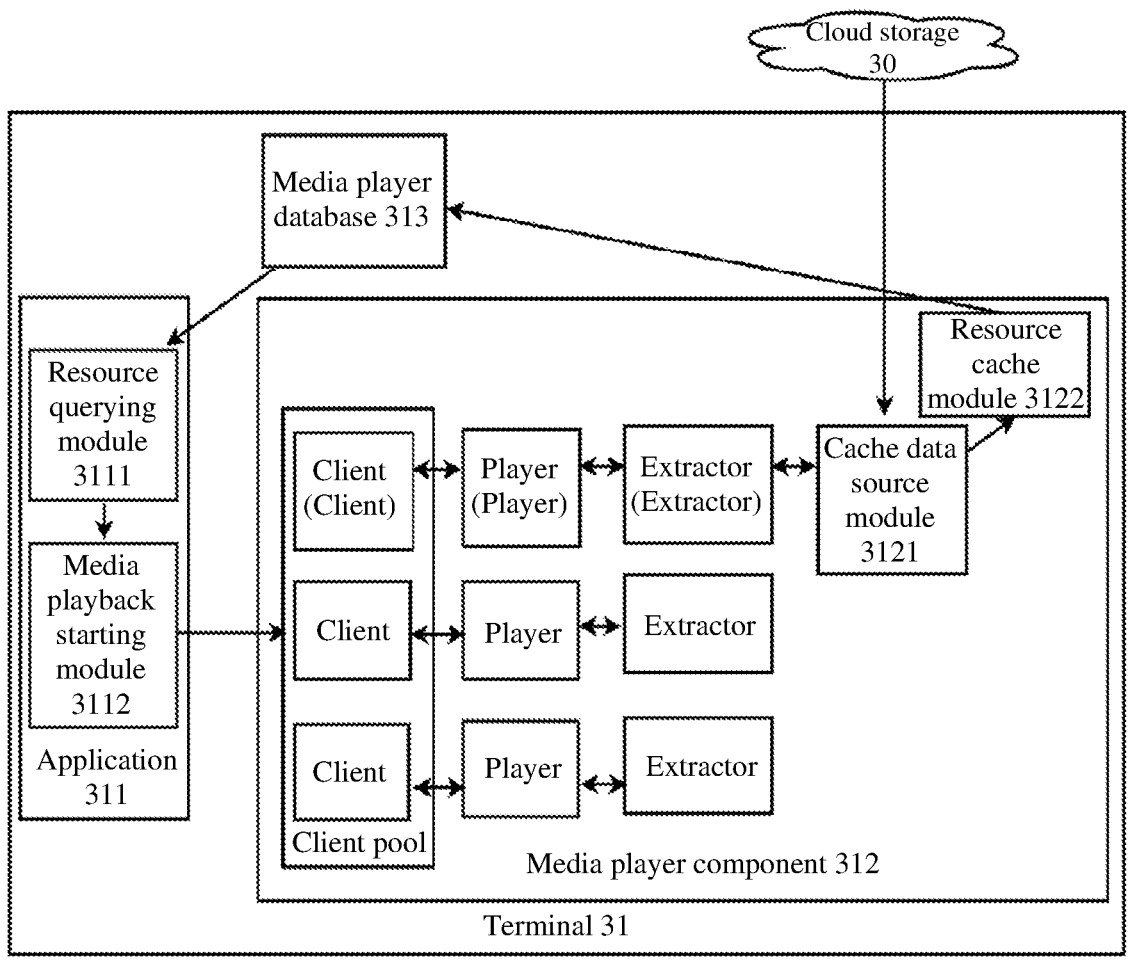
FIG. 3 is a schematic structural diagram of an offline caching system, according to an embodiment of this specification.

According to a second aspect, based on the same inventive concept, FIG. 3 is a schematic structural diagram of an offline caching system, according to an embodiment of the specification.

The system includes a cloud storage 30 and a terminal 31. The cloud storage 30 may include a private cloud storage, a private content network, and the like, which is not limited. In the terminal 31, parts related to this embodiment of this specification are shown, including an application 311 on the application layer, a media player component 312 on the framework layer, and a media player database 313. The application 311 further includes a resource querying module 3111 and a media playback starting module 3112. The media player component 312 further includes a cache data source module 3121 and a resource cache module 3122. In addition, the media player component 312 further includes a client pool, a player, and an extractor.

The cache data source module 3121 downloads a resource from the cloud storage, and submits the resource to the resource cache module 3122 to generate an offline cache file, and the resource cache module 3122 sends the offline cache file to the media player database 313 for storage. When performing resource playback, the application 311 first queries whether an offline cache file exists in the media player database 313 through the resource querying module 3111; and if the offline cache file exists, the application 311 directly reads the offline cache file to perform resource playback; or if the offline cache file does not exists, the application 311 starts the media player component 312 to perform video download and playback through the media playback starting module 3112. In this embodiment of the specification, the resource querying module 3111, the media player database 313, the cache data source module 3121, and the resource cache module 3122 are configured to work cooperatively to implement offline cache storage and reading.

As analyzed above, in conventional Android video caching, a resource download function is performed by using a DataSource module, and when a certain quantity of resource content is downloaded, the content is sent to an extractor for decoding and playing. At the same time, the resource is cached locally, but cannot be permanently maintained. Once the DataSource is destroyed, all caches associated with the DataSource will be lost. To resolve this problem, the cache data source module 3121 (CacheDataSource) and the resource cache module 3122 (MediaCache) are introduced in this embodiment of the specification to replace an original DataSource module. An original streaming media playback function capability is maintained, but a caching policy is modified, that is, the memory caching is written into the MediaCache module to perform the caching function. An offline cache record is written into the media player database 313 (MediaPlayer database) through the MediaCache.

Before playing a video every time, the application queries whether there is an offline cache file in the MediaPlayer database through the resource querying module 3111. If there is an offline cache file, the file is played directly to achieve an effect of playing at any time after performing a one-time download function.

Figure 4:
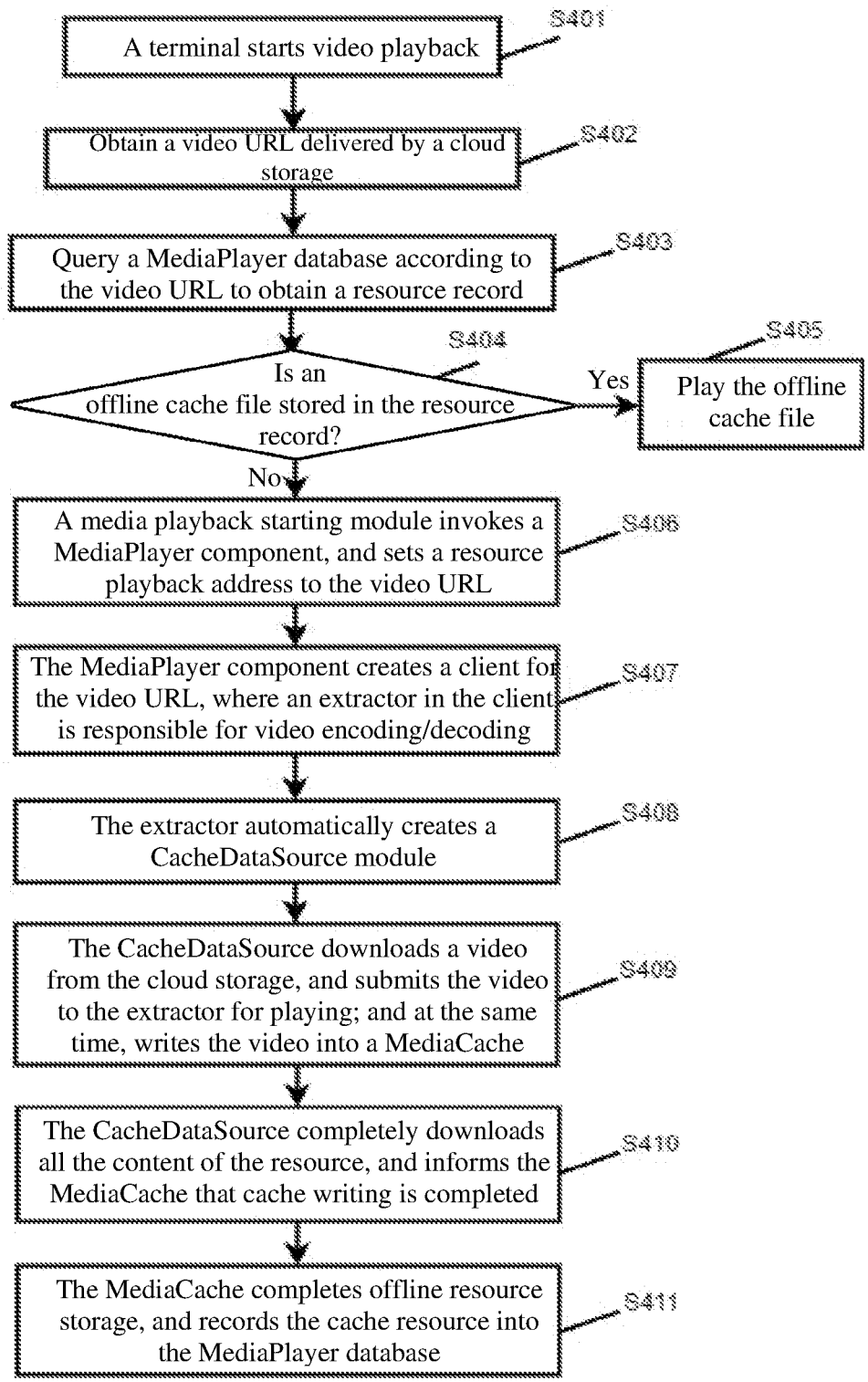
FIG. 4 is an exemplary flowchart of an offline caching method, according to an embodiment of this specification.

FIG. 4 is an exemplary flowchart of an offline caching method, according to an embodiment of this specification. The flowchart is implemented with reference to the schematic structural diagram of the system in FIG. 3, and is merely provided as an example including the following steps.

At S401, the method may include starting a video playback function by a terminal.

At S402, the method may include obtaining a video URL delivered by a cloud storage.

At S403, the method may include querying a MediaPlayer database according to the video URL to obtain a resource record.

At S404, the method may include determining whether an offline cache file is stored in the resource record. If the offline cache file is stored in the resource record, the method may include performing S405; or if the offline cache file is not stored in the resource record, the method may include performing S406.

At S405, the method may include playing the offline cache file.

At S406, the method may include invoking, by a media playback starting module, a MediaPlayer component, and sets a resource playback address to the video URL.

At S407, the method may include creating, by the MediaPlayer component, a client for the video URL, where an extractor in the client is responsible for video encoding/decoding.

At S408, the method may include creating, by the extractor, a CacheDataSource module.

At S409, the method may include downloading, by the CacheDataSource, a video from the cloud storage, and after a certain quantity of content is completely downloaded every time, submitting the content to the extractor for playing; and at the same time, writing the part of resource into the MediaCache.

At S410, the method may include downloading, by the CacheDataSource, all the content of the resource, and informing the MediaCache that cache writing is completed.

At S411, the method may include completing, by the MediaCache, offline resource storage, and recording the cache resource into the MediaPlayer database.

One or more embodiments of this specification have at least the following beneficial effects: by modifying a DataSource module of a MediaPlayer component in Android source code to form a CacheDataSource module and a MediaCache module, a streaming media playback function and decoding capability is maintained, and a memory caching is maintained to generate an offline cache file; therefore, a capability of playing at any time after performing a one-time download function is obtained. No proxy server is involved in the middle of the process, thereby greatly reducing IO of the entire system, and achieving a very smooth playback effect.

According to one aspect, an embodiment of this specification provides an offline caching apparatus, configured to perform offline resource caching on a terminal, and an operating system of the terminal includes a framework layer and an application layer.

Figure 5:
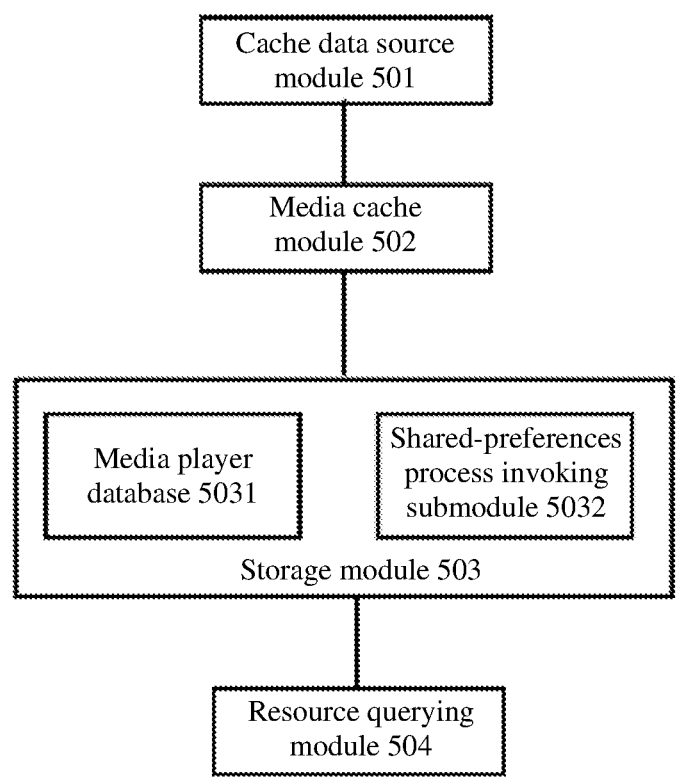
FIG. 5 is a schematic structural diagram of an offline caching apparatus, according to an embodiment of this specification.

FIG. 5 is a schematic structural diagram of the apparatus, and the apparatus includes: a cache data source module 501 and a media cache module 502 on the framework layer, and a storage module 503. The cache data source module 501 is configured to download a media resource from a cloud, and write the media resource into the media cache module; the media cache module 502 is configured to generate, according to the media resource written by the cache data source module, an offline cache file; and the storage module 503 is configured to store the offline cache file, and provide the stored offline cache file to the application layer for access.

In some embodiments, the cache data source module 501 and the media cache module 502 are respectively the cache data source module 501 for downloading streaming media and the media cache module 502 for writing data to a cache that are obtained by modifying source code of a media player component on the framework layer.

In some embodiments, the cache data source module 501 and the media cache module 502 are obtained by modifying the source code of the media player component, maintaining a streaming media playback function and a download function of an original data source module of the media player component, modifying a caching policy, and adding a memory caching maintaining function.

In some embodiments, the storage module 503 includes a media player database 5031. When the media cache module 502 generates the offline cache file, the offline cache file is written into the media player database 5031.

In some embodiments, the storage module 503 includes a shared-preferences process invoking submodule 5032. When the media cache module 502 generates the offline cache file, a shared-preferences process in the operating system is invoked, via the shared-preferences process invoking submodule 5032, to store the offline cache file.

In some embodiments, the player database 5031 or the shared-preferences process invoking submodule 5032 is further configured to provide an access interface to the application layer, for the application layer to read the offline cache file through the access interface.

In some embodiments, the application layer includes a resource querying module 504. The resource querying module 504 is configured to, when starting resource playback, query whether the media player database 5031 or the shared-preferences process invoking submodule 5032 stores the offline cache file; and if the media player database 5031 or the shared-preferences process invoking submodule 5032 stores the offline cache file, the resource query module 504 is configured to read the offline cache file to directly perform resource playback; or if neither the media player database 5031 nor the shared-preferences process invoking submodule 5032 stores the offline cache file, the resource query module 504 is configured to invoke the media player component to perform video download and playback from the cloud storage.

Figure 6:
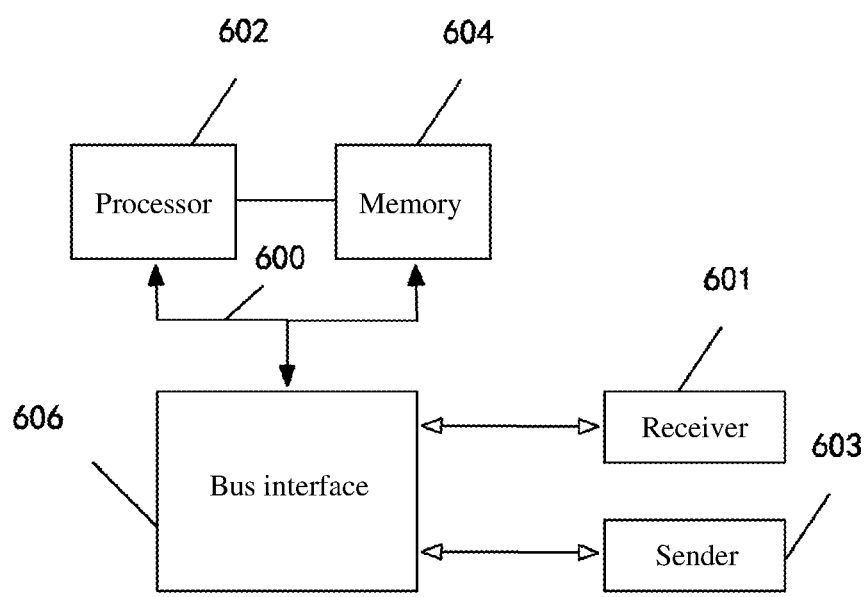
FIG. 6 is a schematic structural diagram of a terminal, according to an embodiment of this specification.

Based on the same inventive concept as the offline caching methods in the foregoing embodiments, the specification further provides a terminal. As shown in FIG. 6, the terminal includes a memory 604, a processor 602, and a computer program stored on the memory 604 and executable on the processor 602. The processor 602 executes the program to implement the steps of any of the offline caching methods described above.

In FIG. 6, in a bus architecture (represented by a bus 600), the bus 600 may include any quantity of interconnected buses and bridges, and the bus 600 connects various circuits including one or more processors represented by a processor 602 and memories represented by a memory 604. The bus 600 may further connect various other circuits such as a peripheral device, a voltage stabilizer, and a power management circuit. These are known in the art, and therefore are not further described in this specification. A bus interface 606 provides an interface between the bus 600 and a receiver 601 and between the bus 603 and a sender 504. The receiver 601 and the sender 603 may be a same element, that is, a transceiver, providing a unit configured to communicate with various other apparatuses on a transmission medium. The processor 602 is responsible for management of the bus 600 and normal processing, and the memory 604 may be configured to store data used when the processor 602 performs an operation.

According to a sixth aspect, based on the same inventive concept as the offline caching methods in the foregoing embodiments, the specification further provides a computer-readable storage medium storing a computer program, and the computer program, when executed by a processor, implements the steps of any of the offline caching methods described above.

The embodiments of the specification are described with reference to the flowchart and/or block diagram of methods, devices (systems), and computer program products. It should be understood that computer program instructions can implement each procedure and/or block in the flowcharts and/or block diagrams and a combination of procedures and/or blocks in the flowcharts and/or block diagrams. These computer program instructions may be provided for a general-purpose computer, a special-purpose computer, an embedded processor, or a processor of any other programmable data processing device to generate a machine, so that the instructions executed by a computer or a processor of any other programmable data processing device generate a device for implementing a specific function in one or more processes in the flowcharts and/or in one or more blocks in the block diagrams.

These computer program instructions may be stored in a computer-readable memory that can instruct the computer or any other programmable data processing device to work in a specific manner, so that the instructions stored in the computer-readable memory generate an artifact that includes an instruction device. The instruction device implements a specific function in one or more processes in the flowcharts and/or in one or more blocks in the block diagrams.

These computer program instructions may also be loaded into a computer or another programmable data processing device, so that a series of operation steps are performed on the computer or another programmable data processing device to generate processing implemented by a computer, and instructions executed on the computer or another programmable data processing device provide steps for implementing functions specified in one or more procedures in the flowcharts and/or one or more blocks in the block diagrams.

Although the exemplary embodiments of this specification have been described, persons skilled in the art may make alterations and modifications to these embodiments once they learn the basic inventive concept. Therefore, the appended claims are intended to be construed as including the exemplary embodiments and all alterations and modifications falling within the scope of this specification.

Apparently, persons skilled in the art may make various modifications and variations to this specification without departing from the spirit and scope of this specification. If these modifications and variations of this specification belong to the scope of the claims of this specification and equivalent technologies thereof, this specification is also intended to cover these modifications and variations.

What is claimed is:

1. A method for performing offline resource caching on a terminal having an operating system, wherein the operating system comprises a framework layer and an application layer, the method comprising:
modifying a data source module of a media player component on the framework layer to create a cache data source module on the framework layer for downloading streaming media and a media cache module on the framework layer for writing the streaming media to a media player database external to the media player component such that when the data source module is destroyed, the streaming media remain at the media player database;
downloading, by the cache data source module, a media resource from a storage, and writing the media resource into the media cache module to generate an offline cache file;
storing the offline cache file at the media player database; and
providing the stored offline cache file to the application layer for access.

2. The method according to claim 1, wherein, the modifying a data source module of a media player component on the framework layer comprises:
maintaining a streaming media playback function and a download function of the data source module of the media player component;
modifying a caching policy; and
adding a memory caching maintaining function.

3. The method according to claim 1, wherein the storing the offline cache file at the media player database comprises:
creating the media player database accessible to the application layer.

4. The method according to claim 3, wherein the providing the stored offline cache file to the application layer for access comprises:
providing, by the media player database, an access interface to the application layer, for the application layer to read the offline cache file through the access interface.

5. The method according to claim 3, further comprising:
querying, when the application layer starts resource playback, whether the media player database stores the offline cache file;
if the media player database stores the offline cache file, reading the offline cache file to perform resource playback; and
if the media player database does not store the offline cache file, invoking the media player component to perform video download and playback from the storage.

6. The method according to claim 5, wherein the reading the offline cache file to perform resource playback comprises:
performing a one-time download function to download the offline cache file; and
playing back the offline cache file.

7. The method according to claim 1, wherein the storing the offline cache file at the media player database comprises:
invoking a shared-preferences process in the operating system to store the offline cache file.

8. The method according to claim 7, wherein the providing the stored offline cache file to the application layer for access comprises:
providing, by the shared-preferences process, an access interface to the application layer, for the application layer to read the offline cache file through the access interface.

9. An apparatus for performing offline resource caching on a terminal having an operating system, wherein the operating system comprises a framework layer and an application layer, the apparatus comprising:
a processor; and
a memory storing instructions executable by the one or more processors to causes the apparatus to perform operations comprising:
modifying a data source module of a media player component on the framework layer to create a cache data source module on the framework layer for downloading streaming media and a media cache module on the framework layer for writing the streaming media to a media player database external to the media player component such that when the data source module is destroyed, the streaming media remain at the media player database;
downloading, by the cache data source module, a media resource from a storage and writing the media resource into the media cache module to generate an offline cache file;
storing the offline cache file at the media player database; and
providing the stored offline cache file to the application layer for access.

10. The apparatus according to claim 9, wherein the modifying a data source module of a media player component on the framework layer comprises:
maintaining a streaming media playback function and a download function of the data source module of the media player component;
modifying a caching policy; and
adding a memory caching maintaining function.

11. The apparatus according to claim 9, wherein the storing the offline cache file at the media player database comprises:
creating the media player database accessible to the application layer.

12. The apparatus according to claim 11, wherein the providing the stored offline cache file to the application layer for access comprises:
providing, by the media player database, an access interface to the application layer, for the application layer to read the offline cache file through the access interface.

13. The apparatus according to claim 11, wherein the operations further comprise:
querying, when the application layer starts resource playback, whether the media player database stores the offline cache file;
if the media player database stores the offline cache file, reading the offline cache file to perform resource playback; and
if the media player database does not store the offline cache file, invoking the media player component to perform video download and playback from the cloud storage.

14. The method according to claim 13, wherein the reading the offline cache file to perform resource playback comprises:
performing a one-time download function to download the offline cache file; and
playing back the offline cache file.

15. The apparatus according to claim 9, wherein the storing the offline cached file at the media player database comprises:
invoking a shared-preferences process to store the offline cache file.

16. The apparatus according to claim 15, wherein the providing the stored offline cache file to the application layer for access comprises:
providing, by the shared-preferences process, an access interface to the application layer, for the application layer to read the offline cache file through the access interface.

17. One or more non-transitory computer-readable storage media configured with instructions executable by one or more processors to cause the one or more processors to perform operations for offline resource caching on a terminal having an operating system, wherein the operating system comprises a framework layer and an application layer, the operations comprising:
modifying a data source module of a media player component on the framework layer to create a cache data source module on the framework layer for downloading streaming media and a media cache module on the framework layer for writing the streaming media to a media player database external to the media player component such that when the data source module is destroyed, the streaming media remain at the media player database;
downloading, by the cache data source module, a media resource from a storage, and writing the media resource into the media cache module to generate an offline cache file;
storing the offline cache file at the media player database; and
providing the stored offline cache file to the application layer for access.

18. The one or more non-transitory computer-readable storage media according to claim 17, wherein the storing the offline cache file at the media player database comprises:
creating the media player database accessible to the application layer.

19. The one or more non-transitory computer-readable storage media according to claim 18, wherein the providing the stored offline cache file to the application layer for access comprises:
providing, by the media player database, an access interface to the application layer, for the application layer to read the offline cache file through the access interface.

20. The one or more non-transitory computer-readable storage media according to claim 17, wherein, the modifying a data source module of a media player component on the framework layer comprises:
maintaining a streaming media playback function and a download function of the data source module of the media player component;
modifying a caching policy; and
adding a memory caching maintaining function.

* * * * *